United States Patent [19]

Tanaka

[11] 4,022,985
[45] May 10, 1977

[54] KEY TELEPHONE SYSTEM WITH A COMMON PUSH-BUTTON SENDER SYSTEM

[75] Inventor: Yoshiaki Tanaka, Tokyo, Japan

[73] Assignee: Oki Electric Industry Company, Ltd., Japan

[22] Filed: Sept. 22, 1975

[21] Appl. No.: 615,528

[30] Foreign Application Priority Data

Oct. 1, 1974 Japan .................. 49-112336

[52] U.S. Cl. .................................................. 179/99
[51] Int. Cl.[2] ........................................ H04M 1/72
[58] Field of Search ........... 179/90 R, 90 K, 90 BB, 179/99, 81 R, 84 VF, 88, 7 R, 16 EC, 18 BA

[56] References Cited

UNITED STATES PATENTS

| | | | |
|---|---|---|---|
| 3,301,967 | 1/1967 | Plyer | 179/84 VF |
| 3,420,961 | 1/1969 | Averill, Jr. | 179/99 |
| 3,603,737 | 9/1971 | Le Dorh et al. | 179/15 AP |
| 3,701,854 | 10/1972 | Anderson et al. | 179/99 |

Primary Examiner—Kathleen H. Claffy
Assistant Examiner—Randall P. Myers
Attorney, Agent, or Firm—Paul & Paul

[57] ABSTRACT

A large scale key-telephone system or telephone exchange system having approximately eighty extension channels and a push-button dial system has been disclosed. A common unit in the system is a DTMF oscillator, which is installed in each telephone set, according to a prior art. The present system is completely compatible with thus prior key-telephone system or exchange system.

3 Claims, 4 Drawing Figures

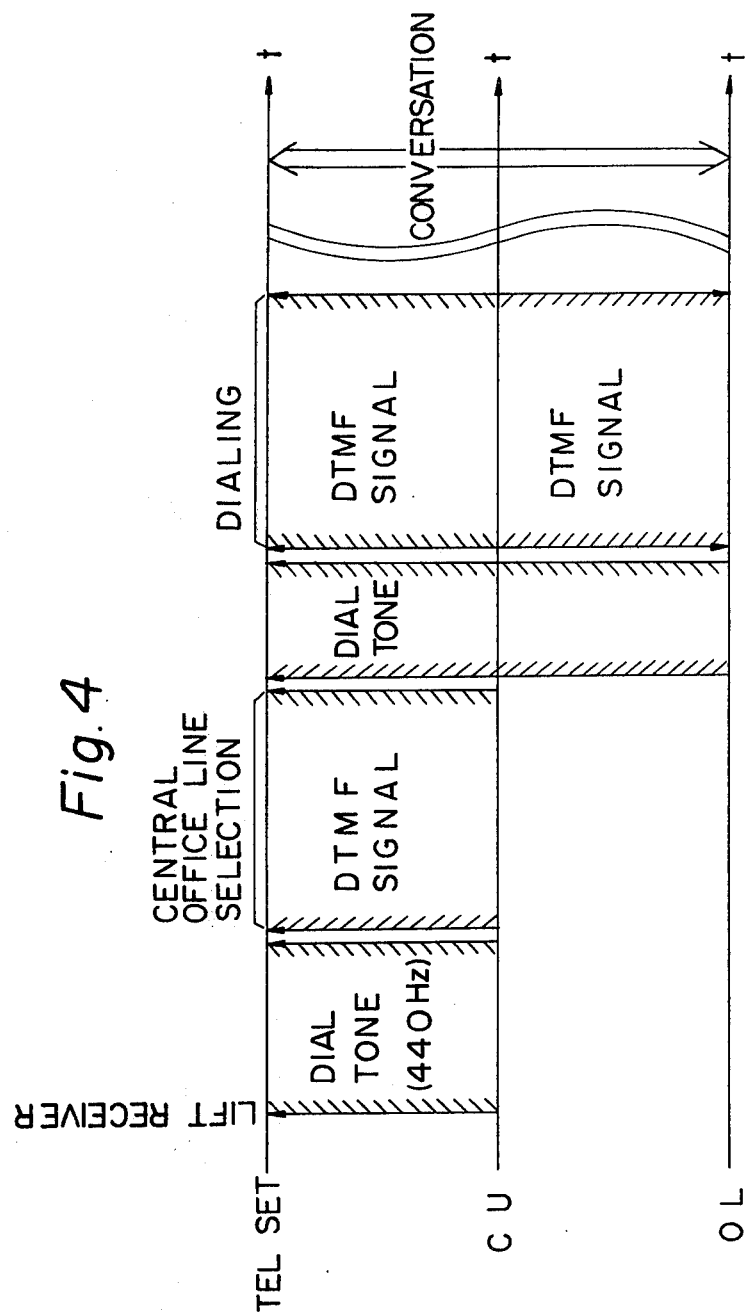

4,022,985

KEY TELEPHONE SYSTEM WITH A COMMON PUSH-BUTTON SENDER SYSTEM

BACKGROUND OF THE INVENTION

The present invention relates to a dual tone multi frequency address signal (DTFM) sender system or a push-button (PB) sender system for a push-button type key telephone system or a simplified telephone exchange system, and particularly relates to a PB sender system having a common DTMF oscillator.

A prior push-button type simplified telephone exchange system has many wires between each telephone set and a common unit. Each telephone set must include an individual DTMF oscillator. Therefore, the structure of the telephone set is complicated and the cost of the system is expensive. Further, the larger the system, the more wires between each telephone set and the common unit is needed. Accordingly, in a prior simplified telephone exchange system, a system having more than thirty telephone sets is almost impossible.

A proposal for overcoming the above disadvantage is to provide a speech path contact in a common unit and reduce the wires between each telephone set and said common unit. However, in this system, each telephone set must still have individual DTMF oscillators. Therefore, many DTMF oscillators are necessary.

SUMMARY OF THE INVENTION

It is an object, therefore, of the present invention to overcome the disadvantages and limitations of said prior telephone exchange system, by providing a new and improved simple telephone exchange system.

The above and other objects can be attained by a push-button sender system comprising a plurality of telephone sets having at least a push-button dial and a shift register connected to said push-button dial, and a common unit connected to each telephone set via a signal line and a control line, and having a common push-button sender for sending a dial tone and a DTMF signal according to the control by a control signal from said shift register, characterized in that said common unit has at least a register link and a central office line link, said register link being connected to both a calling subscriber and said push-button sender so that said calling subscriber can hear the DTMF signal while the calling subscriber selects one of the central office lines, said central office line link being connected to both the calling subscriber and the push-button sender so that the DTMF signal according to the number dialed by the calling subscriber is sent to both the calling subscriber and to the office line.

BRIEF DESCRIPTION OF THE DRAWINGS

The foregoing and other objects, features and attendant advantages of the present invention will be more appreciated as the same become better understood from the accompanying drawings wherein;

FIG. 4 shows the embodiment of the operational time-chart of the present apparatus.

DETAILED DESCRIPTION OF THE PREFERRED EMBODIMENT

Figure 1:
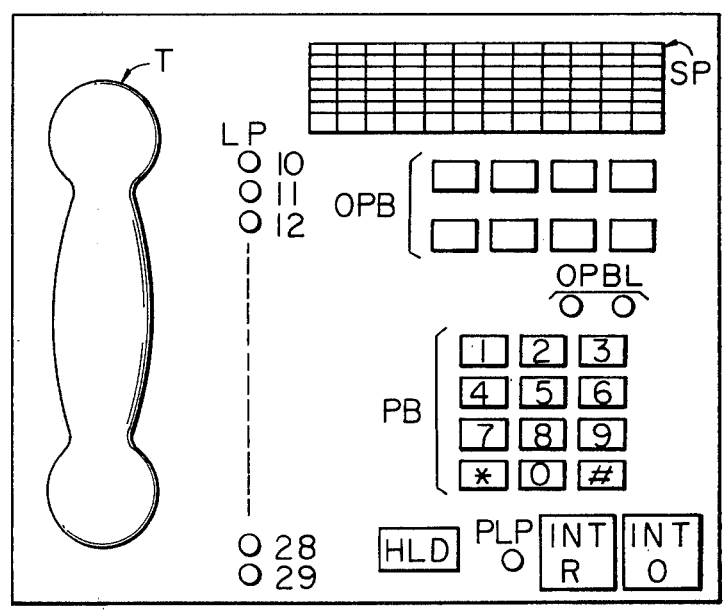
FIG. 1 shows the embodiment of the layout of the telephone set of the present invention.

The appearance of a telephone set according to the present invention will now be described, by referring to FIG. 1. In the figure, the symbol T represents a handset, PB represents push-button dials, SP represents a loud speaker, LP represents lamps displaying the conditions of central office lines, PLP represents a lamp displaying the condition of intra-office lines, OPB represents various option buttons, OPBL represents lamps displaying the conditions in which various optional functions are used, HLD represents a holding button of an central office line, INT(R) represents an intra-office receiving button which should be pushed upon receiving an intra-office call. And INT(O) represents an intra-office originating button which should be pushed when an intra-office call is made.

Figure 2:
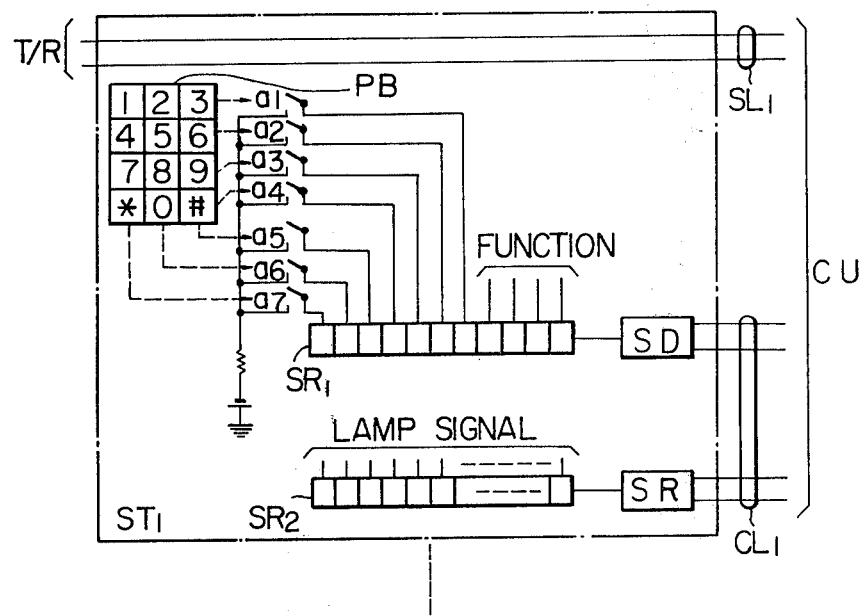
FIG. 2 is a circuit-diagram of a push-button type telephone set according to the present invention.
Figure 2:
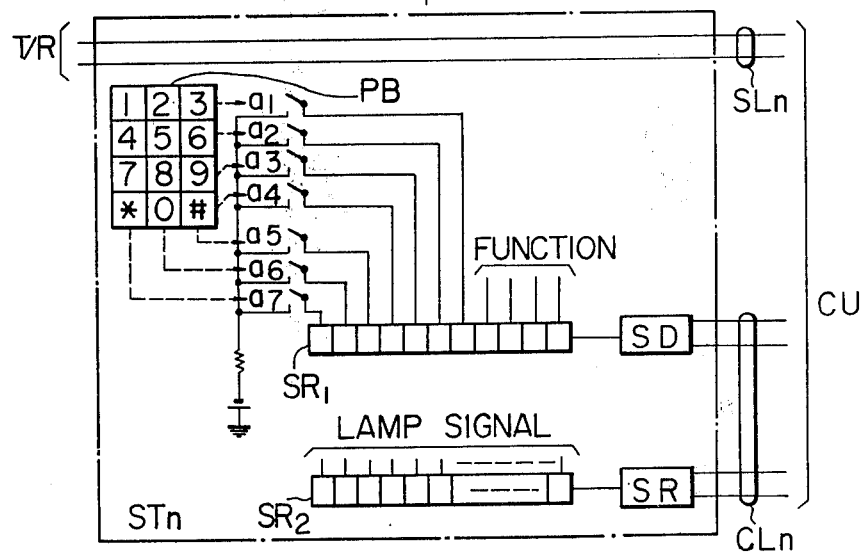

In FIG. 2, the reference symbols $ST_1, \ldots, ST_n$ show telephone sets, and $SL_1, \ldots, SL_n$ show the speech lines connected to the common unit (CU). $a1$ through $a7$ are contacts for the row and for the column of the push-button dial (PB). The seven bits information of said contacts $a1$ through $a7$ is applied to the parallel inputs of the parallel-in-serial-out shift register $SR_1$. The register $SR_1$ also receives the function button information from the function switches or the function button of the telephone set. SD is a signal driver which converts the unbalance signal from the serial output of the shift register $SR_1$ into the balance signal, and is connected to the common unit through the control line $CL_1$ or $CL_n$. SR is a signal receiver which converts the balance signal concerning the indication lamps from the common unit to the unbalance signal, and is connected to the serial input of the serial-in-parallel-out shift register $SR_2$. The parallel output of the shift register $SR_2$ operates a plurality of the indication lamps of the telephone set.

It should be appreciated that none of the telephone sets has a DTMF oscillator.

Figure 3:
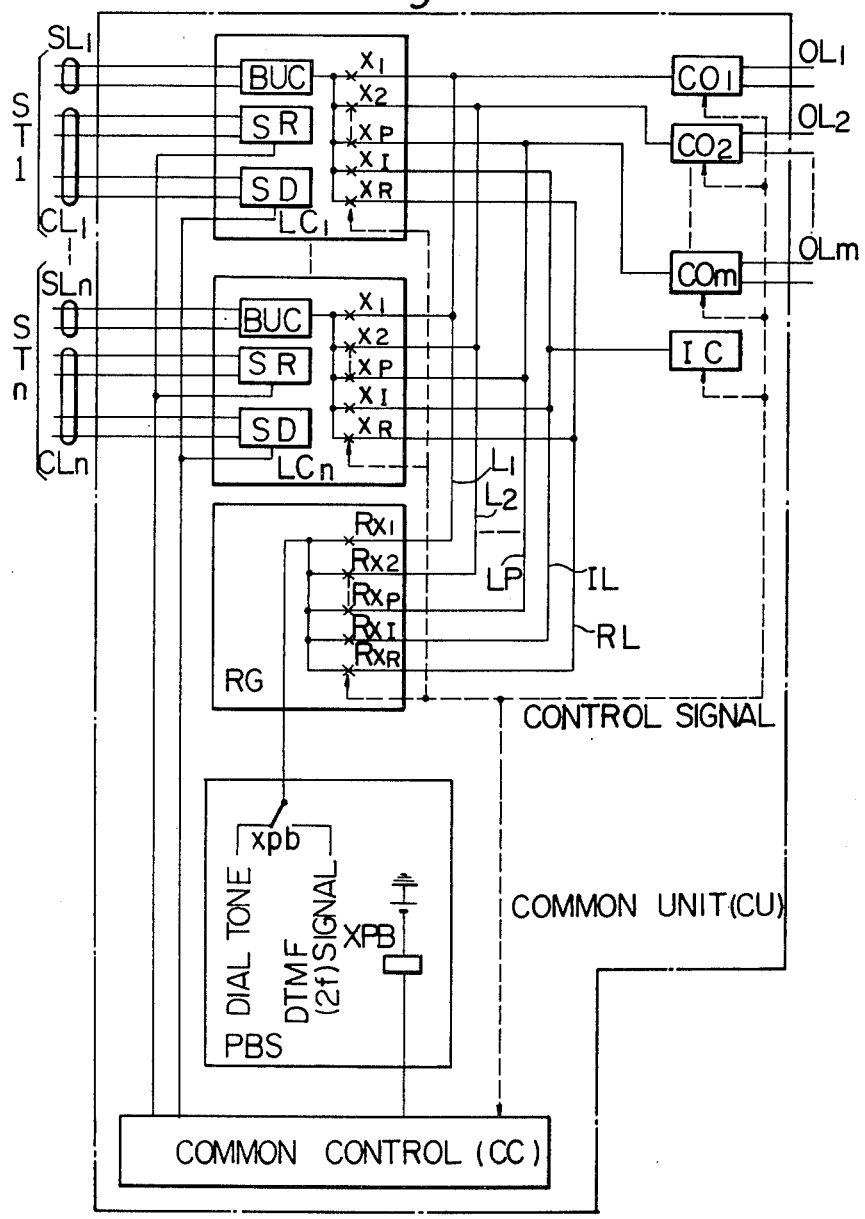
FIG. 3 is a block-diagram of a telehone exchange unit or a common unit (CU) according to the present invention.

FIG. 3 shows the common unit or a telephone exchange, in which $LC_1$ through $LC_n$ are a line connection circuit having a plurality of speech path contacts, a signal driver, a signal receiver and a register for handling a control signal, RG is a register connection circuit having contacts for connecting a PB sender (PBS) to a link. Although a single register connection circuit RG is shown in the drawing for the sake of simplicity, a plurality of the same are provided according to the traffic density. PBS is a PB sender (Push-Button sender) having a sender (not shown) for sending DTMF signals and a dial tone, and a control circuit (not shown) of a DTMF oscillator. A plurality of PB senders are provided according to the traffic density. $CO_1, CO_2, \ldots, COm$ are the central office circuits for connecting the common unit (CU) to the central office (external) lines $OL_1, OL_2, \ldots, OLm$. IC is an internal (extension) circuit for supplying a current to a pair of telephone sets for intra-calls. Common control (CC) effects the centralized control of the common unit. The relay XPB is driven by said common control (CC), and has a transfer contact xpb for switching the dial tone and the DTMF signal $L_1, L_2, \ldots, L_p$ are central office line links and are connected to the central office lines $OL_1, OL_2, \ldots, OLm$ through the central office circuits $CO_1, CO_2, \ldots COm$. IL is an internal (intra-) link connected to the internal circuit IC. When the density of the internal traffic is large, a plurality of said internal links IL and said internal circuits (IC) are provided. RL is a register link connected to the line connection circuits $LC_1, \ldots, LCn$, and the register connection circuit RG. $X_1, X_2, \ldots, Xp$ are contacts for connecting the telephone set $ST_1$ to the office line links $L_1, L_2, \ldots, Lp$. $R_{X1}, R_{X2}, \ldots, R_{Xp}$ are contacts for connecting the PB sender (PBS) to the main wire links $L_1, L_2, \ldots, Lp$. $X_i$ is a contact for connecting the telephone set $ST_1$ to the internal link IL. $X_R$ is a contact for connecting the telephone set $ST_1$ to the register link RL. $R_{XI}$ is a contact for connecting the PB sender (PBS) to the internal link IL. $R_{XR}$ is a contact for connecting the PB sender (PBS) to the register link RL. The operation of these contacts is controlled by the common control (CC). BUC shows a balance-unbalance converter for converting a balanced speech signal from the speech line $SL_1$ to an unbalanced speed signal.

Now, some typical operations of the present system will be explained.

First, the operation which occurs when a subscriber calls an central office line will be explained.

When a subscriber lifts the handset of the telephone set $ST_1$, the signal indicating said lifting of said receiver is sent to the common unit (CU) through the control line $CL_1$, is applied to the common control (CC) through the signal receiver in the line connection circuit $LC_1$. Then, according to the control of the common control (CC), the contact $X_R$ in the line connection circuit $LC_1$ and the contact $R_{XR}$ in the register connection circuit RG is closed. Thus, the dial tone from the PB sender (PBS) is sent to the calling subscriber through the register connection circuit RG, and the balance-unbalance-converter in the line connection circuit $LC_1$. The dial tone is a 440 Hz signal. Next, when the calling subscriber designates for instance the central office line $OL_1$ by pushing push-button switch No. 3, the contacts $a1$ and $a5$ in the telephone set $ST_1$ (FIG. 2) are closed. A seven bit code (1000100) is then applied to the shift register $SR_1$, the content of which is, in serial mode, applied to the signal driver SD which converts the input signal to the balanced signal and transmits the balanced signal to the common control (CC) in the line connection circuit $LC_1$ through the control line $CL_1$. According to this signal, the common control (CC) sends the control signal to the DTMF oscillator (not shown) in the PB sender (PBS), and energizes the relay XPB. Then, the contact $xpb$ of the relay is switched so as to send the two-frequency signal to the calling subscriber through the PB sender (PBS), the register connection circuit RG, the register link RL, and the line connection circuit $LC_1$, respectively. In this way, the calling subscriber can hear the DTMF signal. When the designation of the central office line by the calling subscriber is completed, the common control sends the control signal to the line connection circuit $LC_1$ and the register connection circuit RG so as to connect said line connection circuit and register connection circuit to the designated central office line $OL_1$. Thus, the contact $X_1$ in the line connection circuit $LC_1$ and the contact $R_{X1}$ in the register connection circuit RG are closed. Therefore, the calling subscriber is connected to the central office line $OL_1$ and can hear the dial tone (440 Hz) from the central office line (central telephone exchange office). The calling subscriber then dials the telephone number of the called subscriber by pushing the push-button dial. In each dialing operation made by the calling subscriber, two of the contacts $a1$ through $a7$ are closed and a seven bit control signal whose code relates to the number of the pushed button is applied to the shift register $SR_1$, the content of which is, in turn, applied to the common control (CC) through the signal driver SD in the line connection circuit $LC_1$ and through the signal receiver SR in the common unit CU. Then, the DTMF signal relating to the buttons pushed is sent from the PB sender (PBS) to both the office line $OL_1$ through the register connection circuit RG, the central office line link $L_1$ and the central office line circuit $CO_1$, and to the calling subscriber through the office line link $L_1$, and the balance-unbalance converter BUC in the line connection circuit $LC_1$. Accordingly, the calling subscriber can hear the two frequency signal relating to the number of buttons pushed.

The above operation is shown in the time-chart in FIG. 4.

Next, the operation of the present system for making an intra-call will be explained. When a calling subscriber lifts the handset of the telephone set $ST_1$, the control signal indicating said lifting of the handset is applied to the common control (CC) in the common unit (CU) through the control line $CL_1$ and the signal receiver SR in the line connection circuit $LC_1$. Then, the common control (CC) closes the contact $X_R$ in the line connection circuit $LC_1$ and the contact $R_{XR}$ in the register connection circuit RG. Thus, the dial tone from the PB sender (PBS) is transmitted to the calling subscriber through the register connection circuit RG, the register link RL and the line connection circuit $LC_1$.

Next, when the calling subscriber pushes an intra-office originating button (INTO) on the telephone set (FIG. 1), this information is applied to the shift register $SR_1$ as functional information, and is transmitted to the common control (CC) in the common unit (CU) through the signal driver SD, the control line $CL_1$, and the signal receiver in the line connection circuit $LC_1$. Then, the common control (CC) selects the available internal link IL if a plurality of the same are provided, and closes the contacts $R_{XI}$ and $X_I$ relating to the internal link IL. At this time, the calling subscriber can hear the dial tone from the PB sender (PBS) through the register connection circuit RG, the internal link IL, and the balance-unbalance-converter in the line connection circuit $LC_1$.

Next, when the calling subscriber dials by pushing the push-buttons, the dial information (number information) is inserted into the shift register $SR_1$ and is applied to the common control (CC), which connects the calling subscriber to the called subscriber. The common control (CC) also controls the DTMF oscillator (not shown) in the PB sender (PBS) and changes the transfer contact $xpb$ of the relay XPB so that the DTMF signal is sent from the PB sender (PBS) instead of the dial tone. Said DTMF signal which relates to the number of the pushed button is heard by the calling subscriber since said signal is sent to him through the register connection circuit RG, the internal link IL, and the balance-unbalance-converter BUC in the line connection circuit $LC_1$.

As explained above, according to the present invention, a DTMF oscillator is commonly installed in a common unit (CU) instead of in each telephone set. Therefore, the total number of DTMF oscillators in one system can be reduced, and the size and/or cost of a telephone set can be reduced also. Further, it should be appreciated that the present system is completely compatible with any of the prior telephone exchange systems.

From the foregoing, it will now be apparent that a new and improved push-button sender system has been found. It should be understood, of course, that the embodiment disclosed is merely illustrative and is not intended to limit the scope of the invention. Reference should be made to the appended claims, therefore, rather than to the specification as indicating the scope of the invention.

What is claimed is:

1. A key telephone system comprising a plurality of key telephone sets having at least a push-button dial and a shift register connected to said push-button dial, and a common unit connected to each telephone set via a signal line and to the shift register of each telephone set via a control line, said common unit including a common control, a line connection circuit connected to said common control and responsive to control signals on said control line, and a common push-button sender connected to said common control for sending dial tone and a DTMF signal according to the common control in response to a control signal applied to said control line by said shift register, characterized in that said common unit has at least a register link and a central office line link, said register link being connected to both a calling subscriber and said push-button sender so that said calling subscriber can hear said two-frequency signal while the calling subscriber selects one of the central office lines, said central office line link being connected to both the calling subscriber and the push-button sender so that the DTMF signal according to the dialed number by the calling subscriber is sent to both the calling subscriber and the office line.

2. A key telephone system according to claim 1 wherein said common unit further comprises an internal link which is connected to both the calling subscriber and the push-button sender so that the calling subscriber can hear said two-frequency signal from the push-button sender when he makes an extension call.

3. A key telephone system according to claim 1, wherein said each link is connected to said push-button sender through a mechanical contact of a relay.

* * * * *